US007364762B2

(12) United States Patent
Unwin

(10) Patent No.: US 7,364,762 B2
(45) Date of Patent: Apr. 29, 2008

(54) FOOD HEATING

(76) Inventor: Guy Darell Unwin, Longdon Hall, Longdon, Tewkesbury, Gloucestershire GL20 6AS (GB)

( * ) Notice: Subject to any disclaimer, the term of this patent is extended or adjusted under 35 U.S.C. 154(b) by 731 days.

(21) Appl. No.: 10/803,754

(22) Filed: Mar. 18, 2004

(65) Prior Publication Data

US 2005/0089617 A1 Apr. 28, 2005

(30) Foreign Application Priority Data

Oct. 24, 2003 (GB) ................................. 0324862.2

(51) Int. Cl.
*B65D 81/34* (2006.01)
(52) U.S. Cl. ...................... 426/107; 426/113; 426/234; 426/127; 426/523; 219/400
(58) Field of Classification Search ................ 426/107, 426/113, 234, 127, 523; 219/400
See application file for complete search history.

(56) References Cited

U.S. PATENT DOCUMENTS

| 3,554,770 A | 1/1971 | Lipsky et al. .................. 99/174 |
| 3,891,775 A | 6/1975 | Murray et al. ............... 426/107 |
| 4,212,299 A | 7/1980 | Yokokoji et al. ............ 128/272 |
| 5,728,416 A | 3/1998 | Bono et al. .................. 426/113 |
| 5,853,781 A | 12/1998 | Bono et al. .................. 426/110 |
| 2003/0047838 A1* | 3/2003 | Beale et al. ............. 264/328.1 |

FOREIGN PATENT DOCUMENTS

| EP | 0 202 996 A2 | 11/1986 |
| EP | 0903099 A2 | 9/1998 |
| GB | 1374937 | 4/1973 |
| WO | WO 97/48318 | 6/1997 |
| WO | WO 01/00501 | 6/2000 |

* cited by examiner

*Primary Examiner*—Keith D. Hendricks
*Assistant Examiner*—Vera Stulii
(74) *Attorney, Agent, or Firm*—Heslin Rothenberg Farley & Mesiti P.C.

(57) ABSTRACT

Food heating method and apparatus using containing means, e.g., a pre-formed container 1, such as a relatively flat pouch or envelope comprising at least one panel made of flexible multilayer film with layers 3 and 5 of Perfluoralkoxy (PFA) and Fluorinated Ethylene Propylene (FEP), respectively, on a core layer 3 of Polytetrafluorethylene (PTFE). A sandwich or other foodstuff 23, baked beans or french fries, for example, "chips" or "frites", can be heated by being inserted in the containing means which is then heated by a radiant heat applying device, such as an electric bread toaster. The containing means can be wholly of the multilayer film. The containing means can be in the form of an open bag, which is reusable, or it can be a closed bag sold with the food therein.

16 Claims, 1 Drawing Sheet

U.S. Patent | Apr. 29, 2008 | US 7,364,762 B2 ial (not shown) is placed loosely within the pouch 2 during use, but is removed before the pouch is used again. The material absorbs excess moisture or fats produced by the food during heating.

FOOD HEATING

CROSS REFERENCE TO RELATED APPLICATION

This application claims priority from British application GB 0324862.2 filed on Oct. 24, 2003. The entire disclosure of this British application is incorporated herein by reference.

FIELD OF THE INVENTION

The invention relates to heating food more particularly but not exclusively heating food by radiant heat apparatus, for example a bread toaster.

BACKGROUND OF THE INVENTION

Patent specification number WO 0100501 discloses a container for heating food in a radiant heat device such as a toaster. The container can be in the form of a flat pouch having an open mouth and made of woven fabric coated and/or impregnated with electrically non-conductive and heat resistant material. The material maybe polytetrafluorethylene or tetrafluoroethylene and the woven fabric may be woven glass or poly (p-phenyleneterepthalamide) strands. A sandwich or other foodstuff, baked beans for example, may be placed in the pouch and then inserted in a bread slot of an electric toaster. The toaster can then be switched on and this heats the food in the pouch. The pouch does not have to have an open mouth. For example, as shown in FIG. 5 of specification no. WO 0100501, the pouch may comprise two panels made of glass mesh impregnated with polytetrafluorethylene and connected together and sealed all round by welded PFA tape. Within the pouch, as sold, there is a portion of food such as French fries. The food still in the pouch can be heated in a toaster or the like or in the oven.

SUMMARY OF ASPECTS OF THE INVENTION

According to one aspect of the present invention, there is provided apparatus for heating food comprising containing means for use with a radiant heat applying device and having at least one panel made of flexible multilayer film comprising layers of PFA and FEP on a core layer of PTFE.

According to a second aspect of the invention, there is provided a method of heating food wherein said food is enclosed in containing means having at least one panel made of flexible multilayer film comprising layers of PFA and FEP on a core layer of PTFE, the method further comprising the application of radiant heat to the food whilst it is within said containing means.

Preferably, the film comprises an outer layer of FEP.

In this specification, FEP means Fluorinated Ethylene Propylene and PFA means Perfluoralkoxy. PTFE means Polytetrafluorethylene.

The containing means is preferably pre-formed as a container.

The container has at least one tab or handle for removing the container from a heat-applying device such as a toaster.

Preferably fluid-absorbing means are present inside the container, having hydrophilic and lipophilic properties to absorb excess moisture of fats produced by the food during heating. Such means may be attached or loosely placed within the container at its base.

Different means may be provided in order to alter the thermal conductivity of the container material. This may be necessary in circumstances where it is necessary to cook the center of an article thoroughly, as generally the outer surface of the food cooks more quickly. The inside of the container preferably has a reflective external coating or layer of metal foil or wire. However, it is within the scope of the invention to alter the thermal conductivity of the container by varying the pigment color of the material; for instance a white pigment will retard the heating process and a black pigment will aid the transfer of heat to the interior of the container.

The container may be sized so as to fit into a slot of a toaster, and of sufficient height to allow an adequate proportion of the container to project above the top of the toaster body in use, such that the user will not feel the heat of the container when removing it from the toaster.

The container may comprise a rectangular pouch sealed at three sides and with one open side for enabling the user to insert food such as a sandwich or baked beans to be heated. Alternatively, the pouch may be sealed on all sides and may contain a variety of foods for storage prior to sale, in order to form a range of convenience foods. The pouch may be provided with means for manual opening such as a draw string or tear strip provided on one or more sides, ideally at the top of the pouch as supported in the toaster. Such a range of convenience foods would be ideal for sale at garages, pubs and the like, where instant heating is paramount. Instead of a toaster, an alternative heating means may be used, for example an oven, an infra-red contact heating device, a grill or possibly even a microwave oven.

Advantageously, the container with foodstuffs therein is hygienically sealed within an outer wrapper.

BRIEF SUMMARY OF THE FIGURES

The invention will now be described by way of example only with reference to the accompanying diagrammatic drawings, in which.

DETAILED SUMMARY OF ASPECTS OF THE INVENTION

Figure 1:
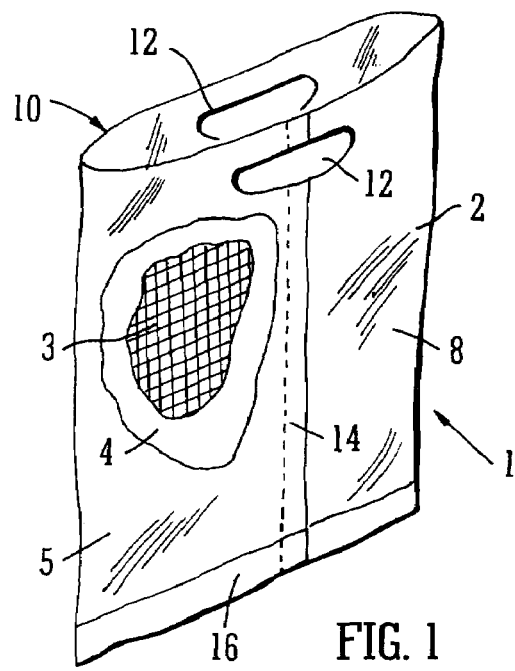
FIG. 1 is a perspective view of one container of the invention.

The container 1 of FIG. 1 is made from a sheet of material which has been folded to form a rectangular pouch 2 closed at three sides and open at the fourth. The material comprises a flexible multilayer film with an inner or core layer 3 of PTFE, then a layer 4 of PFA on each side of the PTFE layer and then respective outer layers 5 of FEP on the PFA. A portion of one of the FEP layers and an included portion of the PFA layer are removed in FIG. 1 so that part of the PTFE layer can be seen. After folding, the edges of the sheet are adhered at a central seam 14 and a lower edge 16 to form the pouch with two facing opposite walls 8 and 10. A slotted hole 12 is provided at the top of each wall. As an alternative, a projecting tab can be provided at the top of each wall.

A sandwich, beans, bacon or even scrambled egg mix may be placed in the pouch and the pouch then placed in the bread slot of an electrical bread toaster. The radiant heat from the toaster elements then cooks or heats the contents of the pouch.

The holes 12 form handles for retrieving the pouch from the toaster. The food to be cooked is placed in the container 1. In this case, the container 1 is accommodating a cheese sandwich (not shown) to be toasted. Fluid absorbing material (not shown) may be located in the bottom of the pouch to draw excess moisture and fats away from the sandwich allowing it more easily to brown.

The container 1 is generally formed from single sheet of material, by folding a strip in half and sealing the ends using heat and pressure to form a tube, and then securing one end of the tube to form a pouch.

To achieve optimum heating characteristics, the container walls could comprise PTFE which is pigmented or aluminized and/or a metallic foil or mesh could be incorporated (not shown).

Figure 2:
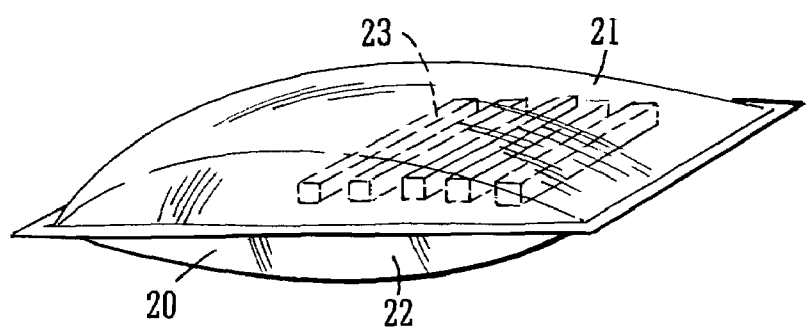
FIG. 2 is a perspective view of another container of the invention.
Figure 3:
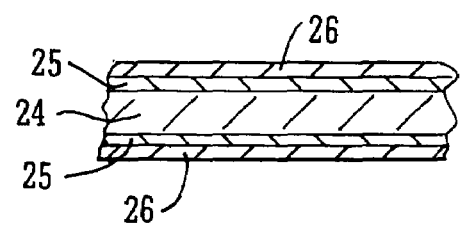
FIG. 3 is a section on part of the FIG. 2 container.

The embodiment of FIGS. 2 and 3 comprises a pouch 20 comprising two flexible walls 21 and 22 sealed all round the periphery of the pouch. A portion of food 23 (for example, French fries) is enclosed in the pouch 20. The walls 21 and 22 are made of flexible multilayer film with a core layer 24 of PTFE, two intermediate PFA layers 25 and two outer layers 26 of FEP. The FEP adheres to itself (and to the PTFE and the PFA) under heat and so forms an easily closable container. The walls 21 and 22 may be (but are not necessarily) of relatively low thickness (for example with a gauge of less than 150 gm per square meter, or less than 100 or better less than 80, or even about 60 to 65 grams per square meter so that they are porous to steam emitted by the food in the pouch when heated, i.e. so they are gas permeable but do not let out appreciable liquid.

The walls 21 and 22 could be perforated to improve porosity. To hermetically seal or at least keep reasonably airtight, the food within the container 20, the latter could be supplied sealed inside an outer bag, which is removed prior to heating.

The multilayer film comprising a base layer of PTFE, intermediate layers of PFA and outer layers of FEP is commercially available, for example from Chemfab corporation under the designation DF1700DB and DF1900DB.

Using the material described, a food item such as a sandwich can be simply wrapped in a sheet of the material and the wrapping sealed by known means such as a hot press or hot filament-sealing device. Later the food item in its wrapping can be heated by a toaster for example.

Aspects of the present invention provide apparatus and methods for heating food. As will be appreciated by those skilled in the art, features, characteristics, and/or advantages of the various aspects described herein, may be applied and/or extended to any embodiment (for example, applied and/or extended to any portion thereof).

Although several aspects of the present invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

I claim:

1. An apparatus for heating food comprising a containing means for use with a radiant heat applying device, the containing means having at least one panel made of a flexible multilayer film comprising at least one layer of PFA, at least one layer of FEP, and a core layer of PTFE.

2. A method of heating food, wherein said food is enclosed in a containing means having at least one panel made of a flexible multilayer film comprising at least one layer of PFA, at least one layer of FEP, and a core layer of PTFE, the method comprising applying radiant heat to the food whilst it is within said containing means.

3. Apparatus according to claim 1, wherein the containing means further comprises at least one of a tab and a handle for facilitating handling of the containing means.

4. Apparatus according to claim 1, wherein fluid-absorbing means is present inside the containing means, the fluid-absorbing means having one of hydrophilic and lipophilic properties to absorb at least one of excess moisture and fats produced by the food during heating.

5. Apparatus according to claim 1, wherein the apparatus is adapted for being received in a bread slice receiving slot of an electric bread toaster.

6. Apparatus according to claim 1, wherein the at least one panel comprises two panels formed as a pouch sealed all around the periphery of the pouch.

7. Apparatus according to claims 1, wherein the at least one panel comprises two panels formed as a pouch sealed around a part of the periphery of the pouch to leave an open mouth for receiving said food.

8. Apparatus as recited in claim 1, wherein the containing means further comprises a foodstuff therein, wherein the containing means with the foodstuff therein is hygienically sealed within an outer wrapper.

9. Method according to claim 2, wherein the containing means has at least one of a tab and a handle for facilitating handling of the containing means.

10. Apparatus according to claim 3, wherein fluid-absorbing means is present inside the containing means, the fluid-absorbing means having one of hydrophilic and lipophilic properties to absorb one of excess moisture and fats produced by the food during heating.

11. Apparatus according to claim 3, wherein the at least one panel comprises two panels formed as a pouch sealed all around the periphery of the pouch.

12. Apparatus according to claim 3, wherein the at least one panel comprises two panels formed as a pouch sealed around a part of the periphery of the pouch to leave an open mouth for receiving said food.

13. Apparatus according to claim 3, wherein the containing means further comprises a foodstuff therein, wherein the containing means with the foodstuff therein is hygienically sealed within an outer wrapper.

14. Method according to claim 2, wherein the food comprises a foodstuff, and wherein the method further comprises hygienically sealing the containing means with the foodstuff therein within an outer wrapper.

15. Apparatus according to claim 1, wherein the at least one layer of PFA comprises two intermediate layers of PFA each adjacent the core layer of PTFE, and wherein the at least one layer of FEP comprises at least two outer layers of FEP each adjacent one of the two intermediate layers of PFA.

16. Method according to claim 2, wherein the at least one layer of PFA comprises two intermediate layers of PFA each adjacent the core layer of PTFE, and wherein the at least one layer of FEP comprises at least two outer layers of FEP each adjacent one of the two intermediate layers of PFA.

* * * * *